United States Patent
Cubaines (10) Patent No.: US 9,584,037 B2
(45) Date of Patent: Feb. 28, 2017

(54) CURRENT SIGNAL GENERATOR AND METHOD OF IMPLEMENTING SUCH A GENERATOR

(71) Applicant: GEO27 S.A.R.L, Luxembourg (LU)

(72) Inventor: Fabrice Cubaines, Saint-Jean Lagineste (FR)

(73) Assignee: GEO27 S.A.R.L, Luxembourg (LU)

( * ) Notice: Subject to any disclaimer, the term of this patent is extended or adjusted under 35 U.S.C. 154(b) by 362 days.

(21) Appl. No.: 14/346,119

(22) PCT Filed: Sep. 21, 2012

(86) PCT No.: PCT/EP2012/068705
§ 371 (c)(1),
(2) Date: Mar. 20, 2014

(87) PCT Pub. No.: WO2013/041708
PCT Pub. Date: Mar. 28, 2013

(65) Prior Publication Data
US 2015/0303820 A1 Oct. 22, 2015

(30) Foreign Application Priority Data
Sep. 22, 2011 (FR) ...................................... 11 02879

(51) Int. Cl.
*H02M 5/45* (2006.01)
*H02M 5/458* (2006.01)
(Continued)

(52) U.S. Cl.
CPC ........... *H02M 5/4585* (2013.01); *H02M 1/08* (2013.01); *H02M 2001/0077* (2013.01); *H02M 2001/0093* (2013.01)

(58) Field of Classification Search
CPC ....... H02M 5/4585; H02M 2001/0077; H02M 2001/0093
(Continued)

(56) References Cited

U.S. PATENT DOCUMENTS 5,347,443 A * 9/1994 Muramatsu ........... H02M 5/458
318/778
5,508,594 A * 4/1996 Underwood .............. B60L 3/00
318/139
(Continued)

FOREIGN PATENT DOCUMENTS

EP 0 267 391 A1 5/1988
WO 95/10881 A1 4/1995

OTHER PUBLICATIONS

Alonso et al: "Cascaded h-bridge multilevel converter for grid connected photovoltaic generators with independent maximum power point tracking of each solar array", PESC'03. 2003 IEEE 34th, Annual Power Electronic Specialists Conference, Conference Proceedings, Acarulco, Mexico, Jun. 15-19, 2003; [New York;IEEE, US,vol. 2,p. 731-735,ISBN;9780780377547].*
(Continued)

*Primary Examiner* — Timothy J Dole
*Assistant Examiner* — Nusrat Quddus
(74) *Attorney, Agent, or Firm* — Young & Thompson (57) ABSTRACT

A generator for providing regulated current signals, to terminals of a load includes: a plurality of secondary stages, including a direct voltage source insulated from those of other stages, connected in series between the midpoint of the second half-bridge of each secondary stage and the midpoint of the first half-bridge of the next secondary stage, the load terminals being respectively connected to the midpoint of the first half-bridge of a first secondary stage, and to the midpoint of the second half-bridge of a last secondary stage; and a control circuit capable of: selecting a group of secondary active stages, and at least one regulating stage; simultaneously controlling each active stage, except the regulating stage, at the frequency of the current slots; controlling the regulating stage according to a frequency higher than the previous one; and controlling the switches of the non-selected secondary stages to insulate their voltage source.

8 Claims, 3 Drawing Sheets

(51) Int. Cl.
*H02M 1/08* (2006.01)
*H02M 1/00* (2006.01)

(58) Field of Classification Search
USPC ............ 363/37, 39–41, 56.02, 56.03, 97–98, 363/131–134
See application file for complete search history.

(56) References Cited

U.S. PATENT DOCUMENTS

| | | | |
|---|---|---|---|
| 5,734,565 A | 3/1998 | Mueller et al. | |
| 5,757,633 A | 5/1998 | Bowles | |
| 5,831,409 A * | 11/1998 | Lindberg | H05K 7/20927 180/65.8 |
| 6,556,461 B1 | 4/2003 | Khersonsky et al. | |
| 2007/0147098 A1 | 6/2007 | Mori et al. | |
| 2011/0089765 A1 | 4/2011 | Iwata et al. | |
| 2012/0212983 A1* | 8/2012 | Schreiber | H02M 3/1582 363/37 |
| 2013/0229835 A1* | 9/2013 | Yamanaka | H02M 5/4585 363/37 |
| 2015/0003132 A1* | 1/2015 | Woywode | H02M 7/5387 363/132 |
| 2015/0085545 A1* | 3/2015 | Cubaines | H01J 37/32027 363/126 |

OTHER PUBLICATIONS

International Search Report, dated Apr. 18, 2013, from corresponding PCT application.

\* cited by examiner

CURRENT SIGNAL GENERATOR AND METHOD OF IMPLEMENTING SUCH A GENERATOR

BACKGROUND OF THE INVENTION

Field of the Invention

The invention concerns a generator of current signals, more particularly such a generator that is capable of generating gating pulses of current of a high intensity (of the order of a few tens of amperes) regulated with great precision under a very high voltage of the order of several kilovolts. The invention is also directed towards a process for implementing such a generator.

Description of the Related Art

In certain applications—such as electrolysis, sterilization, the preparation of plasmas under vacuum, or for carrying out tests aiming to determine certain physical constants of homogeneous or inhomogeneous materials, such as, for example, their conductivity or their dielectric and/or inductive constants—it is sometimes necessary to apply voltages or calibrated currents through said materials, with predetermined periods of application of these currents or voltages.

Thus it may be useful in certain cases to apply to the terminals of a load—constituted, for example, by two electrodes inserted at a distance from one another in the material to be measured—current signals in the form of gating pulses of alternating polarity separated by so-called periods of relaxation during which no voltage and no current is applied. Ordinarily, use is made of a simple temporal sequence, in which a gating pulse of positive voltage of a few seconds is applied to the terminals of the load, then a period of relaxation of the same duration, followed by a gating pulse of negative voltage of the same duration, itself followed by a second period of relaxation.

By applying such a signal between two current-injection electrodes which are fixed in the material, certain characteristics of which it is desired to measure, and by measuring a resultant signal between two other measuring electrodes which are placed, for example, between the two injection electrodes, the resistivity and the dielectric constant of the material can be determined by comparing the shapes of the injected signal and of the measured signal.

For the precision of the measurements it is necessary to regulate the current applied during the positive or negative gating pulses, or even to inject this signal in the form of gating pulses of current, the voltage then adapting itself continuously, depending on the current to be obtained. In addition, it is essential that the gating pulses of current exhibit temporal characteristics (for example, concerning the rise-time of the edges of the signals) that are as effective as possible in order to enable a comparison without bias between the injected signal and the measured signal.

Generators are known that are used, for example, in the applications cited above or for the study of soils within the scope of the construction of buildings or of civil-engineering structures, or for the measurement of the moisture content in soils or in silos for storage of pulverulent materials. However, the known generators are suitable for measurements within a reduced operating range and develop voltages limited to a few hundred volts and a few hundred milliamperes.

A need therefore remains for a generator enabling high-tension signals, of the order of several kilovolts, to be provided, said signals being capable of causing a current to flow amounting to a few tens of amperes with a precision of less than one percent, in order to improve the performance of the known generators and to enable measurements to be performed on materials exhibiting high and/or highly variable impedance values.

SUMMARY OF THE INVENTION

The invention is directed towards such a generator that is simple and economical to produce and that exhibits high reliability.

The invention is, in addition, directed towards such a generator that can be transported relatively easily, in order to realize measurements in numerous places.

The invention is also directed towards such a generator that is able to operate within a very wide range of output impedances and that exhibits rise-times, for gating pulses of current for example, of less than a millisecond.

In order to do this, the invention concerns a generator of current signals that is suitable to provide gating pulses of regulated current of alternating polarity under high voltage to the terminals of a load, said generator comprising a plurality of circuits, so-called secondary stages, each secondary stage including at least one source of DC voltage isolated from the voltage sources of the other secondary stages, and a switching circuit comprising four switches arranged in first and second half-bridges each formed of two switches connected in series between the positive pole and the negative pole of the voltage source, the secondary stages being interconnected in such a way that the midpoint of the second half-bridge of each secondary stage is linked to the midpoint of the first half-bridge of the following secondary stage, the terminals of the load being linked respectively to the midpoint of the first half-bridge of a first secondary stage and to the midpoint of the second half-bridge of a last secondary stage, and a control circuit, characterized in that said control circuit is suitable to:

select a group of secondary stages, so-called active stages, depending on a set point of a current flowing in the load, control the switches of the non-selected secondary stages, in order to isolate their voltage source.

select from said active stages at least one stage, the so-called regulation stage, control simultaneously the switches of each active stage, with the exception of the regulation stage, at the frequency of the current signals, so as to place the voltage sources of these stages in series, control the switches of said regulation stage in accordance with a frequency higher than the preceding frequency, with a control duty cycle that is suitable to regulate the current flowing in the load to the set point.

By virtue of the mounting of the switches of the secondary stages, it is possible, depending on the control applied to the switches of each stage, to arrange each stage in series with, or in opposition to, the neighboring stages, or to isolate the voltage source of the stage being considered in relation to the neighboring stages without thereby interrupting the passage of the current in the load. Consequently it is possible to select certain secondary stages and, by switching them simultaneously, synchronously with the edges of the signal to be obtained and at the frequency of said signal, to connect them in series in order to obtain, almost instantaneously, a voltage that is suitable to cause the desired current to flow in the load, depending on the impedance thereof. Therefore the rise-times of the gating pulses of current can be reduced. In order to obtain the desired performance in terms of precision of the regulation of the current passing through the load, a single one of the secondary stages connected in series is driven at a high frequency (several kHz) in accordance with a pulse-width-modulation control exhibiting a duty cycle depending on the difference between the value of the current passing through the load and a set point, enabling switching the totality of the stages at high frequency to be avoided, and therefore enabling the power dissipated in the switches to be limited.

Advantageously and according to the invention, the voltage source of each secondary stage includes a secondary winding of a transformer supplied by a primary stage, a diode rectifier bridge and a filter capacitor. By using a secondary winding of a transformer, the voltage source of each secondary stage is galvanically isolated from the voltage sources of the other stages. In addition, the value of the transformation ratio enables the value of the no-load voltage of the secondary stage to be fixed without having an influence on that of the other stages.

In a first variant of the generator according to the invention, the transformer is a single-phase transformer and the rectifier bridge of each secondary stage includes four diodes. Such a transformer turns out to be less bulky at equivalent current or power and is composed of less copper than a three-phase transformer and is therefore less costly.

Advantageously and according to the invention, the primary stage of the generator includes a switching circuit that is suitable to supply a primary winding of the single-phase transformer with a chopped single-phase current. In this way, by using a chopping frequency of the primary current of the order of several hundreds or thousands of Hz it is possible to reduce further the volume (and the mass) of the magnetic cores of the transformer, enabling a generator to be obtained that is lighter and less bulky and therefore more easily transportable.

In a second variant of the generator according to the invention, the transformer is a three-phase transformer and the rectifier bridge of each secondary stage includes six diodes. By distributing the power onto three primary windings, the switching operations involving high current in the primary are limited.

Advantageously and according to the invention, the primary windings of the transformer are directly coupled to a source of three-phase current. In this way, the complexity of a primary stage with chopping is avoided, the primary stage being in this case purely passive, and the reliability of the assembly is improved.

Advantageously and according to the invention, the primary stage includes a generating set providing the current supply of the stage. The use of a generating set in order to feed the primary stage of the generator, whatever the variant being considered, enables a generator to be obtained that is autonomous, easy to shift, and capable of being used without constraint for connection to an electrical network.

Advantageously and according to the invention, the voltage sources of the secondary stages exhibit a staging of their output voltage in an open circuit, enabling a precise adjustment of the output voltage of the generator. By judiciously choosing the voltages of the secondary stages, it is possible to adjust the voltage at the output terminals of the generator with great precision, for example less than 5% of the maximum voltage, by placing an appropriate selection of these secondary stages in series while causing each secondary stage being used to operate at its maximum efficiency.

Advantageously and according to the invention, the switches are insulated-gate bipolar transistors. The insulated-gate bipolar transistors (IGBT) enable high voltages and/or high currents to be switched without requiring high control energy, enabling them to be controlled by means of a control stage that is simple and that consumes little energy. In addition, the switches that are used include an antiparallel diode between collector and emitter, enabling a passage of reverse current without it being necessary to control the transistor, further limiting the dissipation of energy in the transistors and therefore the rise in temperature thereof.

Advantageously and according to the invention, said transistors are mounted on oil radiators. In this way, the monitoring of the temperature of the cooling oil enables a possible overheating of the switches to be avoided and, if the case arises, enables the control circuit to be informed thereof, in order to deactivate the secondary stage concerned or to stop the generator.

Advantageously and according to the invention, the control circuit is linked to the switches by an optical-fiber link. Since the switching of high currents and/or of high voltages is liable to interfere with the electrical control lines, the use of a distribution of the controls by optical fiber enables high reliability of the generator as well as simplified cabling to be guaranteed, the same fiber being able to transport multiplexed control information intended for a plurality of secondary stages. In addition, the use of isolating optical-fiber links enables the galvanic isolation of the secondary stages between themselves and from the earth to be improved.

The invention also extends to a process for generating current signals, said process being suitable to provide gating pulses of regulated current of alternating polarity under high voltage to the terminals of a load, in which process:

use is made of a generator including a plurality of secondary stages each including a DC voltage source isolated from the voltage sources of the other secondary stages, and a switching circuit comprising four switches arranged in first and second half-bridges each formed of two switches connected in series between the positive pole and the negative pole of the voltage source, the secondary stages being interconnected in such a way that the midpoint of the second half-bridge of each secondary stage is linked to the midpoint of the first half-bridge of the following secondary stage, the terminals of the load being respectively linked to the midpoint of the first half-bridge of a first secondary stage and to the midpoint of the second half-bridge of a last secondary stage, a group of secondary stages, so-called active stages, is selected, depending on a set point of a current flowing in the load, the switches of the non-selected secondary stages are controlled, in order to isolate their voltage source, from said active stages at least one stage, the so-called regulation stage, is selected, the switches of each active stage, with the exception of the regulation stage, are controlled simultaneously at the frequency of the gating pulses of current so as to place the voltage sources of these stages in series, the switches of said regulation stage are controlled in accordance with a frequency higher than the preceding frequency, with a control duty cycle that is suitable to regulate the current flowing in the load to the set point.

The invention also concerns a generator and a process for implementing said generator, characterized in combination by all or some of the features mentioned above or below.

BRIEF DESCRIPTION OF THE DRAWING FIGURES

Other objects, characteristics and advantages of the invention will become apparent from the following description and from the accompanying drawings, in which.

Figure 1:
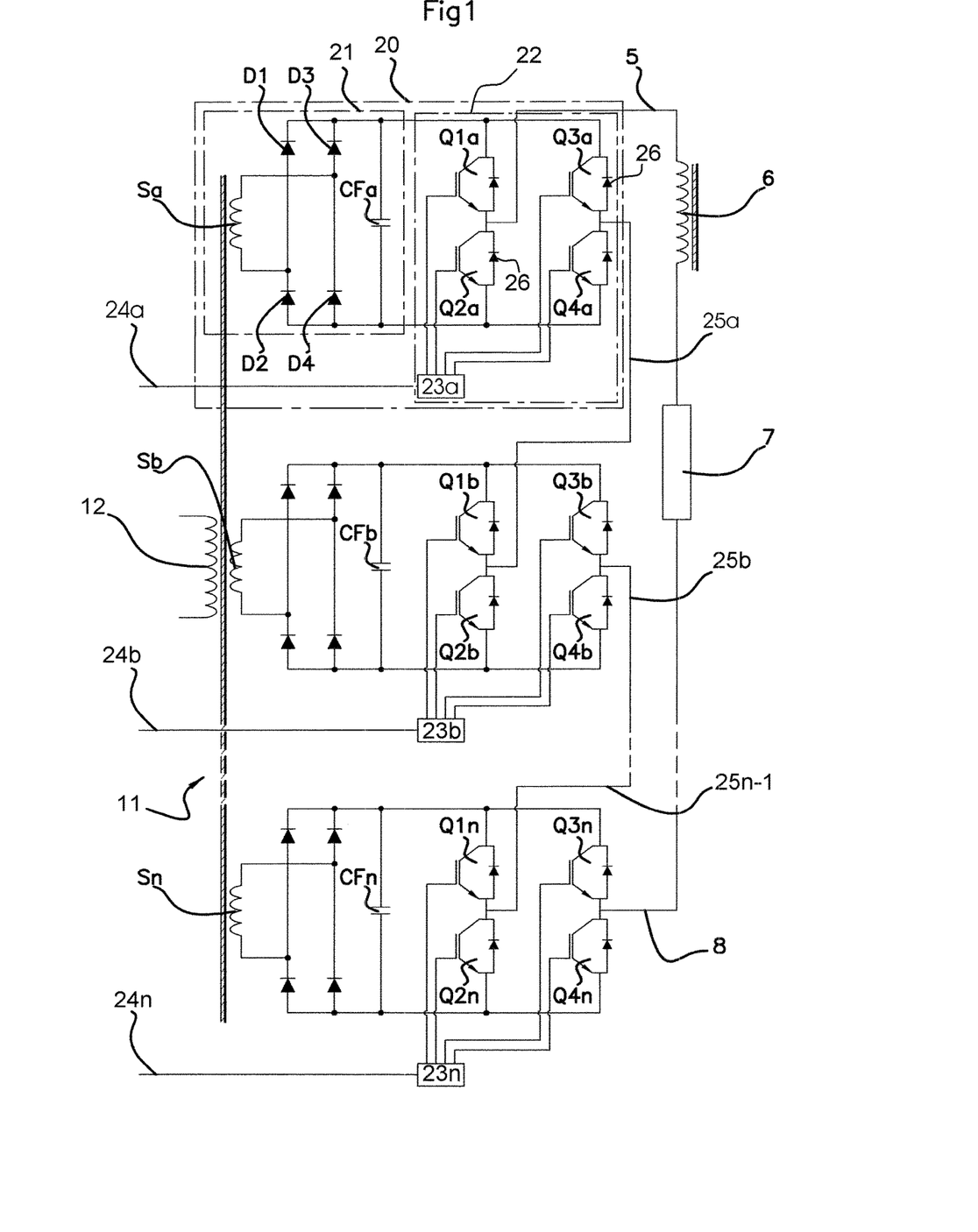
FIG. 1 represents a diagram of the secondary stages of a generator according to the invention according to a first, single-phase variant.

The generator 1 of current signals according to the invention includes a plurality of secondary stages 20 (20a-20n) each comprising a source 21 of DC voltage and a switching circuit 22.

DETAILED DESCRIPTION OF THE INVENTION

In the text that follows, the elements of the same secondary stage are identified by an identical alphabetic index when said stage has to be distinguished from a neighboring stage; on the other hand, the generic reference (without index) is used when an element is being designated in general, without it being necessary to distinguish the stage to which it pertains. Thus, for example, switching circuit 22a of the first secondary stage 20a (respectively switching circuit 22b of secondary stage 20b, etc.) will be designated, or otherwise, in general manner, the switching circuit 22 of any secondary stage 20.

The switching circuit 22 comprises four switches Q1-Q4 arranged in accordance with a mounting on two half-bridges, switches Q1 and Q2 (respectively Q3 and Q4) being connected in series between the positive pole and the negative pole of the voltage source 21. Each switch is preferably realized by means of an insulated-gate bipolar transistor (or group of transistors) (IGBT) chosen within a range suitable for the expected performance of the generator. By way of non-limiting application example, a generator according to the invention, with a power of the order of 100 kW, is provided for supplying gating pulses of current of an intensity of the order of 60 A to a load of variable impedance between 10Ω and 10Ω, and exhibits ten secondary stages, the no-load voltages of which rise in stages from 160 V to 1800 V for a maximum total voltage of the order of 11 kV. Thus, for example, each switch will be chosen to be capable of allowing a current of an intensity of the order of 60 A to flow in the on-state, and to hold a voltage of 2000 V at least in the off-state.

Each switch includes an antiparallel diode 26 that is suitable to enable the flow of a reverse current in the switch. Such a diode is generally inherent in the construction of an IGBT, but in view of the high currents flowing in the generator of the invention it may be useful to double the inherent diode by means of an external diode. The diode 26 is connected by its cathode to the positive terminal of the switch with which it is associated, and by its anode to the negative terminal of said switch.

In the first secondary stage 20a the midpoint of the first half-bridge constituted by switches Q1a and Q2a point is linked by a line 5 and a smoothing inductor 6 to a first terminal of the load 7. The midpoint of the second half-bridge constituted by switches Q3a and Q4a is connected by a line 25a to the common point of switches Q1b and Q2b, the midpoint of the first half-bridge of the following secondary stage. The switching circuits of the secondary stages are thus linked in series, from the midpoint of the second half-bridge of one stage to the midpoint of the first half-bridge of the following stage, as far as the last secondary stage 20n in which the midpoint of the second half-bridge constituted by switches Q3n and Q4n is linked by a line 8 to the second terminal of the load 7.

The gates of the switches Q1 to Q4 are linked to an optical converter 23 that is suitable to transform a control received in optical form through the intermediary of an optical fiber 24 into an appropriate electric control. The optical fibers 24a-24n conveying the respective controls of the switching circuits 22a-22n of the secondary stages are linked at the end opposite the optical converters 23 to a control circuit 15 (FIG. 2) that is suitable to generate the control signals for switching of the various stages. The control circuit 15 may be realized in any manner known to a person skilled in the art, in hardwired logic, programmable by microprocessor(s) or by means of a computer that has been programmed in accordance with the process for operation which will be described below.

Each secondary stage 20 also includes a source 21 of DC voltage, galvanically isolated from the voltage sources of the other secondary stages. In the example represented in FIG. 1, the source 21 of DC voltage includes a secondary winding S of a single-phase transformer 11, the primary winding 12 of which is fed by a primary stage 10 represented in FIG. 2. The single-phase alternating current provided by the secondary winding S is then subjected to full-wave rectification by a bridge of diodes D1 to D4 and is filtered in a filter capacitor CF. In the application example cited previously, the ten secondary stages are provided in order to provide a total maximum no-load voltage of the order of 11 kV, with five stages each providing a voltage of 1800 V, and the remaining five stages respectively providing voltages of 900 V, 500 V, 280 V, 200 V and 160 V.

Figure 2:
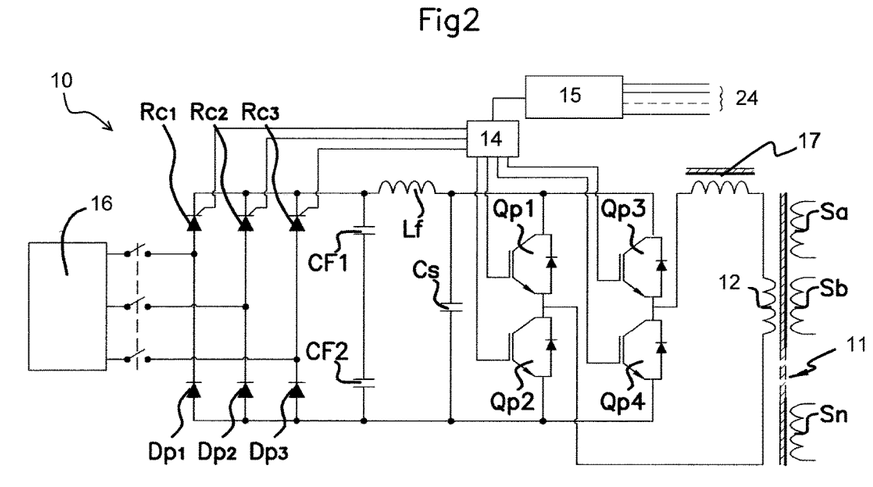
FIG. 2 is a diagram of a primary stage of a generator according to the invention according to a first, single-phase variant.

In a first, single-phase variant represented in FIG. 2 and corresponding to the voltage sources 21 described above, the primary stage 10 includes a source of AC voltage, for example in the form of a generating set 16 with three-phase output. This generating set 16, with a power of the order of 200 kVA, could also be replaced by a link to a single-phase or three-phase electrical distribution network that is capable of providing an equivalent power. The use of a generating set is preferable in the case where the generator of the invention has to be mobile.

The electric current provided by the generating set 16 is rectified in a three-phase rectifier including three diodes Dp1 to Dp3 and three controlled rectifiers such as thyristors Rc1 to Rc3. The current thus rectified is filtered by two filter capacitors CF1 and CF2 in series between the positive and negative poles and a filter inductor Lf in series in the positive pole. A capacitor Cs branched between the positive and negative poles downstream of the filter inductor Lf ensures a smoothing of the DC supply thus obtained. Four switches Qp1 to Qp4 are connected in accordance with an H-bridge mounting between the positive and negative poles of the supply. The primary winding 12 of the transformer 11 is placed in the horizontal branch of the H between the common point of switches Qp1 and Qp2 and the common point of Qp3 and Qp4. A compensation inductor 17 is placed in series with the primary winding 12. In order to cause an alternating current to flow in the primary winding, the switches are controlled two by two, diagonally and in opposition, in order to cause the current to flow alternately in one direction or in the other in the primary winding 12. Thus, when Qp1 and Qp3 are on and Qp2 and Qp4 are off, the current passes through the primary winding in one direction and in reverse; when Qp1 and Qp3 are off and Qp2 and Qp4 are on, the current flows in the opposite direction. The switches Qp1 to Qp4 are also each realized by means of an insulated-gate bipolar transistor (or group of transistors) (IGBT) controlled by an optical converter 14 connected to the control circuit 15 by an optical fiber 13. The optical converter 14 is also suitable, if need be, to control the thyristors Rc1 to Rc3.

Advantageously, the inverter thus created is suitable to operate at a high chopping frequency (in comparison with the usual frequencies of the electrical distribution networks), of the order of a few kHz. In this way, the saturation of the magnetic cores of the transformer 11 is reduced, enabling their volume, and therefore their mass and their cost, to be minimized in a ratio corresponding to the frequency ratio between the chopping frequency and the usual frequency of the electrical distribution network. The frequency employed is also sufficiently low in order not to bring about excessive switching losses, especially in the presence of considerable switched powers.

As will be seen subsequently in relation to the operation of the generator, not all the secondary stages are used simultaneously, and in this case the inductance of the secondary windings S relative to the primary can be reduced. The compensation inductor 17 then enables the current in the primary winding 12 of the transformer to be limited.

Figure 3:
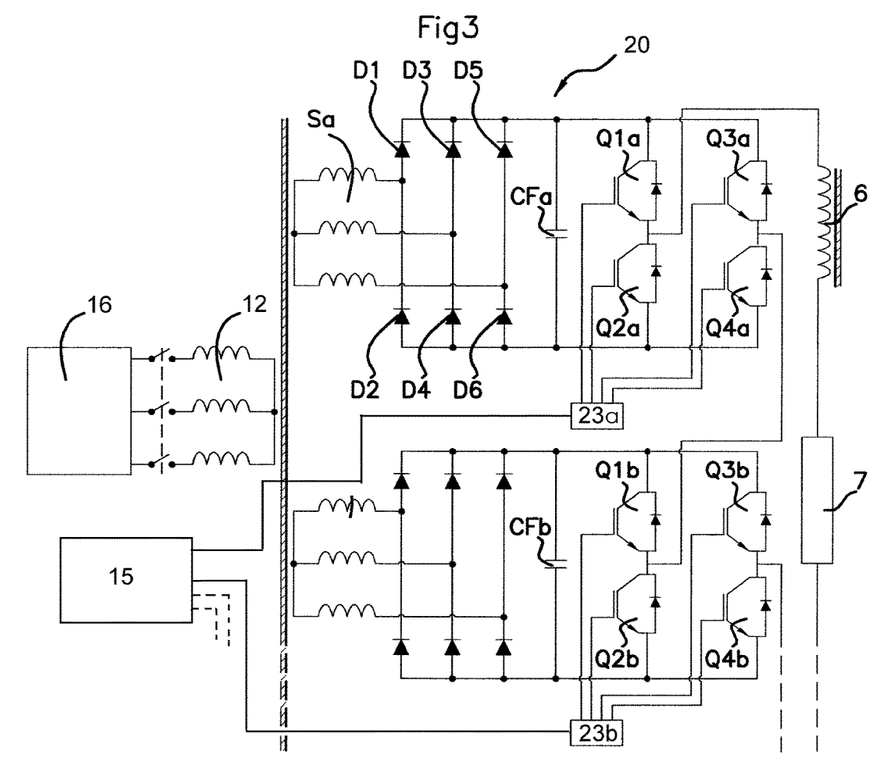
FIG. 3 is a diagram of the generator in a second, three-phase variant.

In a second variant of the generator according to the invention, illustrated in FIG. 3, the primary stage 10 is simply made up of the generating set 16 operating as three-phase generator, which is linked directly (to the safety switches close by) to the primary windings 12 of a three-phase transformer 11. The primary stage 10 is then greatly simplified and does not comprise more than passive elements. Its reliability is therefore considerably enhanced. However, as seen previously, the frequency of the electric current feeding the transformer 11 is then of the same order of magnitude as the usual frequencies of the distribution networks, to the detriment of the volume of the magnetic cores of the transformer.

In this variant the secondary stages 20 exhibit a source 21 of DC voltage that is suitable for operation with a three-phase transformer—that is to say, the secondary winding S of the transformer takes the form of three windings, each linked, on the one hand, to a common point and, on the other hand, to the midpoint of a respective branch of a rectifier bridge including six diodes D1 to D6. The cathodes of diodes D1, D3 and D5 are linked to a positive terminal of a filter capacitor CF, the other terminal of which, the negative terminal, is linked to the anodes of diodes D2, D4 and D6. The switching circuit 22 of the secondary stage and its diagram of interconnection with the other secondary stages are unchanged in comparison with the first variant.

The operation of the generator according to the invention will now be explained in detail by describing succinctly the various states in which a secondary stage may be found, depending on the control applied to the switches of the switching circuit 22. For the remainder, a direction of flow of the current is defined arbitrarily as positive when the current enters the load 7 through line 5 and emerges therefrom through line 8.

When the control circuit 15, through the intermediary of the optical fiber 24 and the optical converter 23, sets an on-state (ON) at switches Q1 and Q4, it controls an off-state (OFF) at switches Q2 and Q3, in order not to short-circuit the voltage source 21. In the case of the first secondary stage 20a, the positive terminal of source 21a is connected to line 5 of the load through the intermediary of switch Q1a. The negative terminal of source 21a is linked to the common point of switches Q1b and Q2b of the following secondary stage through the intermediary of switch Q4a and line 25a. On the assumption that secondary stage 20b is controlled in similar manner, switch Q1b then connects the negative terminal of source 21a to the positive terminal of source 21b. Reasoning by analogy about all the stages, it appears that source 21a causes a current of positive direction to flow in the load 7.

When the control circuit 15 sets, conversely, an on-state at switches Q2a and Q3a and an off-state at Q1a and Q4a, it is the negative terminal of source 21a which is connected to line 5 of the load, and the positive terminal of source 21a is linked via Q3a and line 25a to the common point of switches Q1b and Q2b of the following secondary stage. On the assumption that secondary stage 20b is controlled in similar manner, switch Q2b then connects the positive terminal of source 21a to the negative terminal of source 21b. Reasoning by analogy about all the stages, it then appears that source 21a causes a current of negative direction to flow in the load 7.

It is also possible to control the state of the switches so as to isolate the source 21 of one or more secondary stages of the circuit of the load without thereby interrupting the continuity of the series of secondary stages. For this demonstration it will be assumed that most of the secondary stages have been controlled to cause a positive current to pass in the load, and that it is desired to isolate voltage source 21b of secondary stage 20b. By controlling switches Q1b and Q3b to the off-state and switch Q4b to the on-state, it will be observed that the current flows in stage 20b by entering through line 25b at the common point of Q3b and Q4b, passes through Q4b and the antiparallel diode 26 of Q2b, in order to exit stage 20b through line 25a. It will thus be observed that source 21b has remained isolated from the circuit for passage of current. It will also be noted that the state of switch Q2b is not decisive for the passage of current.

Of course, when the current in the load 7 is flowing in the negative direction the role of switches Q2b and Q4b is reversed, the current entering through line 25a, passing through Q2b, then necessarily in the on-state, and the antiparallel diode of Q4b, in order to leave again through line 25b.

It will also be noted that in view of the symmetry of the switching circuit it is also possible to isolate the voltage source of a stage by controlling switches Q2 and Q4 into the off-state and switches Q1 and Q3 into the on-state, depending on the direction of the current in the load.

The table below summarizes the controls to be applied to the switches in order to insert the source 21 respectively in series in the positive direction, in series in the negative direction, or in order to isolate the voltage source, depending on the direction of the current in the load.

| Q1 | ON | OFF | OFF | ON | OFF | X |
|---|---|---|---|---|---|---|
| Q2 | OFF | ON | X | OFF | ON | OFF |
| Q3 | OFF | ON | OFF | X | OFF | ON |
| Q4 | ON | OFF | ON | OFF | X | OFF |
| Source 21 | Direction + | Direction − | Isolated (dirn. +) | | Isolated (dirn. −) | |

Figure 4A:
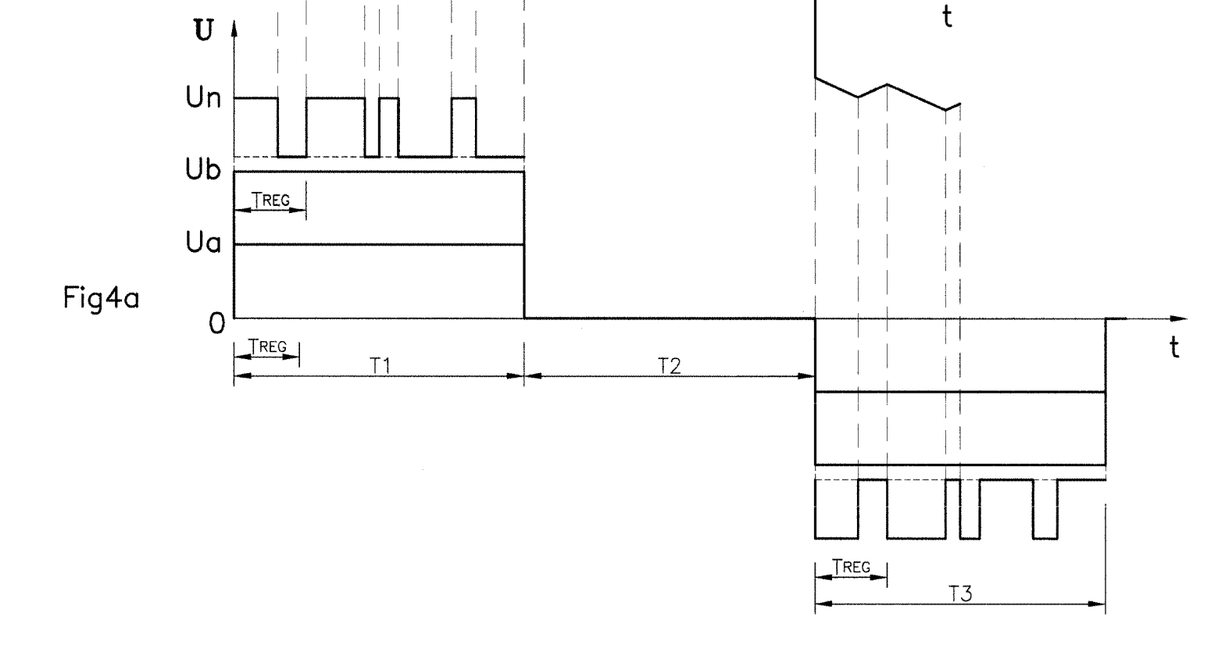
FIGS. 4a and 4b represent timing diagrams that are useful for understanding the operation of the generator according to the invention.
Figure 4B:
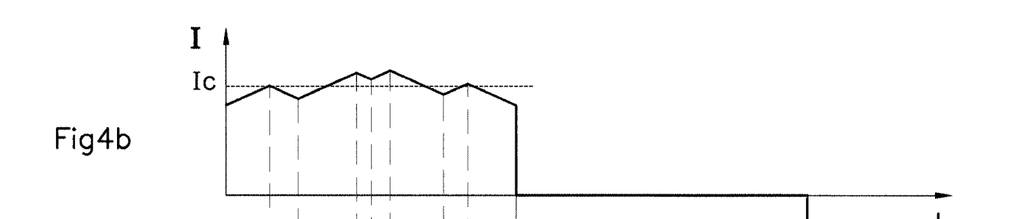

Reference is made to FIG. 4, in which two graphs have been represented enabling the operation of the generator according to the invention to be better understood.

As mentioned above, in order to perform certain measurements aiming to determine electrical characteristics of a material, one procedure is to apply to a load 7, for example a pair of electrodes inserted into the material to be measured, a periodic current signal in the form of gating pulses having a first period T1 of application of a gating pulse of positive regulated current, a period T2 of relaxation, followed by a period T3 of application of a gating pulse of negative regulated current, this period itself being followed by another period of relaxation. Preferentially, a temporal sequence is defined in such a way that the four periods are equal and adjustable between 2 seconds and 4 seconds for example, resulting in a temporal sequence with a total duration from 8 seconds to 16 seconds representing the period of the current signal.

Depending on the material to be measured, a set-point current is defined for each gating pulse of current (FIG. 4b). Preferably the same set point, in absolute value, is defined for the positive and negative gating pulses. The set point Ic is adjustable between 0 A and 60 A in steps of 0.1 A, for example.

The control circuit 15 is suitable to control the switches Q1 to Q4 of the secondary stages in order to place at least one secondary stage in series and to establish a current in the load 7. A means for measuring the current flowing in the load, for example a Hall-effect current sensor or Rogowski-coil current sensor (not represented) placed around one of the lines 5 or 8 for feeding the load enables an actual value of the current flowing in said load to be provided. Depending on the difference between this actual value and the set point, the control circuit is programmed to implement two distinct and complementary adjustment strategies.

In a first period, in order to make a coarse adjustment of the intensity of the current in the load, the control circuit 15 selects, depending on the estimated impedance of the load, a group of secondary stages, so-called active stages, the sum of the voltages of which enables a current to be caused to flow in the load that is at least equal to the set point Ic. The switches of the active stages are then controlled so that these stages are connected in series at the same time, for example by simultaneously controlling their switches Q1 and Q4 into the on-state, and Q2 and Q3 into the off-state. As a corollary, the switches of the non-selected stages are controlled so as to isolate their voltage source from the circuit for feeding the load.

By simultaneously controlling switches Q1 and Q4 (respectively Q2 and Q3) of the various secondary stages selected, the placing in series of their voltage sources and their application to the terminals of the load 7 take effect at the same time, thus enabling the rise-time of the gating pulse of current through the load to be reduced. In addition, the control circuit 15 can be simplified.

In a second period, but preferentially almost simultaneously, from the active stages at least one secondary stage, the so-called regulation stage, is selected, the switches of which are activated at a much higher frequency than the frequency of the current signal. For example, whereas period T1 is of the order of one second, the control period $T_{REG}$ of the regulation stage is of the order of 50 μs. The control circuit 15 controls the switches of the regulation stage so as to place in series and then isolate its voltage source in accordance with period $T_{REG}$ by modulating the duty cycle of the control so as to drive the actual current flowing in the load 7 to the set point Ic.

Advantageously, the control circuit 15 is suitable to choose the regulation stage from the active stages having the lowest voltage. For example, as regulation stage the stage exhibiting a no-load voltage of the order of 200 V is chosen in preference to the active stages exhibiting voltages from 500 V to 1800 V.

As can be observed in FIG. 4a, the active stages, for example secondary stages 20a and 20b providing voltages Ua and Ub, are controlled simultaneously and continuously during period T1, whereas the regulation stage, for example secondary stage 20n, is controlled in accordance with period $T_{REG}$.

By virtue of the smoothing inductor 6 in series with the load 7, the all-or-nothing control of the regulation stage enables the current in the load 7 to be adjusted with great precision, less than 1% of the set point. Moreover, since only the regulation stage is switched at high frequency, the magnetic core of the smoothing inductor 6 does not saturate, the currents generated by other active stages behaving as direct currents over period T1.

It is to be noted that if the servo-control of current realized by the regulation stage turns out to be insufficient, for example if the control duty cycle of the stage tends to 1 or 0, the control circuit 15 is suitable to control the insertion in series of an additional active stage or even the removal of one of the active stages or the replacement thereof by a stage of lower voltage.

At the conclusion of period T1 the control circuit 15 simultaneously isolates all the secondary stages of the supply circuit of the load, the voltage applied to the terminals of said load is reduced to zero, just like the current that flows through it, for a period T2 of relaxation. During this period the power delivered by the generating set can be shunted onto an external load resistor (not represented), in order to avoid power surges.

At the conclusion of period T2 the control circuit 15 inverts the polarities of the stages that were active during period T1, by simultaneously controlling switches Q1 and Q4 into the off-state, and Q2 and Q3 into the on-state during period T3. Analogously, the regulation stage is controlled by pulse-width modulation in period $T_{REG}$ by inverting its polarity. At the conclusion of period T3 the control circuit 15 isolates all the voltage sources of the active stages for a new period of relaxation, at the conclusion of which the sequence resumes at the beginning of T1.

Thus the generator according to the invention and its process of implementation enable gating pulses of regulated current to be provided with great precision, exhibiting a minimum ripple factor and a reduced rise-time, by simultaneously placing in series independent secondary stages having varying voltages, operating continuously for the duration of each gating pulse.

Of course, this description is given solely by way of illustrative example, and a person skilled in the art will be able to make many modifications thereto without departing from the scope of the invention, such as, for example, using an electrical feed of the generator from an electrical distribution network rather than a generating set if the suitable network is available or if mobility of the generator is not being sought. In addition, the control of the switching circuits of the secondary stages could be carried out solely by electrical means or by using switches that are suitable to be directly controlled optically.

The invention claimed is:

1. A generator of current signals, suitable to gating pulses of regulated current of alternating polarity under high voltage to the terminals of a load, said generator comprising:
   a plurality of circuits, so-called secondary stages,
      each secondary stage including at least one source of DC voltage isolated from the voltage sources of the other secondary stages, and a switching circuit comprising four switches arranged in first and second half-bridges each formed of two switches connected in series between the positive pole and the negative pole of the voltage source, the secondary stages being interconnected in such a way that the midpoint of the second half-bridge of each secondary stage is linked to the midpoint of the first half-bridge of the following secondary stage, the terminals of the load being respectively linked to the midpoint of the first half-bridge of a first secondary stage and to the midpoint of the second half-bridge of a last secondary stage, and a control circuit, select a group of secondary stages, so-called active stages, depending on a set point of a current flowing in the load, select from said active stages at least one stage, the so-called regulation stage, control simultaneously the switches of each active stage, with the exception of the regulation stage, at the frequency of, and synchronously with, the gating pulses of current, so as to place the voltage sources of these stages in series, control the switches of said regulation stage in accordance with a frequency higher than the preceding frequency, with a control duty cycle that is suitable to regulate the current flowing in the load to the set point, control the switches of the non-selected secondary stages, in order to isolate their voltage source, wherein the voltage source of each secondary stage includes a secondary winding of a three-phases transformer fed by a primary stage, a diode rectifier bridge including six diodes and a filter capacitor.

2. The generator as claimed in claim 1, wherein the transformer is directly coupled to a three-phase current source.

3. The generator as claimed in claim 2, wherein the three-phase current source is a generating set.

4. The generator as claimed in claim 1, wherein the voltage sources of the secondary stages exhibit a staging of their output voltage in an open circuit, enabling an adjustment of the output voltage of the generator.

5. The generator as claimed in claim 1, wherein the switches are insulated-gate bipolar transistors.

6. The generator as claimed in claim 5, wherein said transistors are mounted on oil radiators.

7. The generator as claimed in claim 1, wherein the control circuit is linked to the switches by an optical-fiber link.

8. A process for generation of current signals, suitable to provide gating pulses of regulated current of alternating polarity under high voltage to the terminals of a load, in which:

a generator including a plurality of secondary stages each including a source of DC voltage isolated from the voltage sources of the other secondary stages, said voltage source including a secondary winding of a three-phase transformer and a six-diodes rectifier bridge, and a switching circuit comprising four switches arranged in first and second half-bridges each formed of two switches connected in series between the positive pole and the negative pole of the voltage source are used, the secondary stages being interconnected in such a way that the midpoint of the second half-bridge of each secondary stage is linked to the midpoint of the first half-bridge of the following secondary stage, the terminals of the load being respectively linked to the midpoint of the first half-bridge of a first secondary stage and to the midpoint of the second half-bridge of a last secondary stage, wherein:

current signals in the form of gating pulses are voluntarily generated, a group of secondary stages, so-called active stages, is selected, depending on a set point of a current flowing in the load, from said active stages at least one stage, the so-called regulation stage, is selected, simultaneously the switches of each active stage, with the exception of the regulation stage, are controlled at the frequency of, and synchronously with, the gating pulses of current, so as to place the voltage sources of these stages in series, the switches of said regulation stage are controlled in accordance with a frequency higher than the preceding frequency, with a control duty cycle that is suitable to regulate the current flowing in the load to the set point, the switches of the non-selected secondary stages are controlled, in order to isolate their voltage source.

\* \* \* \* \*

UNITED STATES PATENT AND TRADEMARK OFFICE
CERTIFICATE OF CORRECTION

PATENT NO. : 9,584,037 B2  
APPLICATION NO. : 14/346119  
DATED : February 28, 2017  
INVENTOR(S) : Fabrice Cubaines Page 1 of 1

It is certified that error appears in the above-identified patent and that said Letters Patent is hereby corrected as shown below:

In the Claims

In Column 11, Line 11:
"a control circuit,"
Should be replaced with:
--a control circuit, suitable to:--.

Signed and Sealed this
Twenty-third Day of May, 2017

Michelle K. Lee
*Director of the United States Patent and Trademark Office*